US011315161B2

(12) United States Patent
Cao et al.

(10) Patent No.: US 11,315,161 B2
(45) Date of Patent: Apr. 26, 2022

(54) METHOD, MEDIUM, AND SYSTEM FOR GENERATING INFORMATION

(71) Applicant: Baidu Online Network Technology (Beijing) Co., Ltd., Beijing (CN)

(72) Inventors: Hongwei Cao, Beijing (CN); Yuedong Hu, Beijing (CN); Tengfei Tong, Beijing (CN); Junfang Yang, Beijing (CN); Shuying Deng, Beijing (CN)

(73) Assignees: Baidu Online Network Technology (Beijing) Co., Ltd., Beijing (CN); Shanghai Xiaodu Technology Co., Ltd., Shanghai (CN)

( * ) Notice: Subject to any disclaimer, the term of this patent is extended or adjusted under 35 U.S.C. 154(b) by 247 days.

(21) Appl. No.: 16/665,917

(22) Filed: Oct. 28, 2019

(65) Prior Publication Data
US 2020/0219161 A1 Jul. 9, 2020

(30) Foreign Application Priority Data

Jan. 8, 2019 (CN) .......................... 201910016657.X

(51) Int. Cl.
*G06Q 30/00* (2012.01)
*G06Q 30/06* (2012.01)
(52) U.S. Cl.
CPC ..... *G06Q 30/0625* (2013.01); *G06Q 30/0601* (2013.01)
(58) Field of Classification Search
CPC .................. G06Q 30/0625; G06Q 30/0601
See application file for complete search history.

(56) References Cited

U.S. PATENT DOCUMENTS 9,286,364 B2    3/2016   Kuruganti et al.
2019/0325330 A1*  10/2019  Roy ...................... G06N 5/047

FOREIGN PATENT DOCUMENTS

| CN | 106610684 A | 5/2017 |
| CN | 106779897 A | 5/2017 |
| CN | 108198050 A | 6/2018 |
| CN | 108230044 A | 6/2018 |

OTHER PUBLICATIONS https://web.archive.org/web/20180324064719/https://neilpatel.com/what-is-conversion-optimization/(Year: 2018).*

* cited by examiner

*Primary Examiner* — Matthew E Zimmerman
(74) *Attorney, Agent, or Firm* — Kilpatrick Townsend & Stockton LLP

(57) ABSTRACT

Disclosed are a method and apparatus for generating information. A method may include: acquiring total number information and initial routing information of a specified item, the initial routing information including current at least one piece of item supply link information and at least one piece of item display link information corresponding to the specified item; querying at least one initial link path between the at least one piece of item supply link information and the at least one piece of item display link information of the initial routing information; determining an updated link path between the at least one piece of item supply link information and the at least one piece of item display link information based on the total number information and the at least one initial link path; and generating and transmitting updated routing information through the updated link path.

7 Claims, 7 Drawing Sheets

METHOD, MEDIUM, AND SYSTEM FOR GENERATING INFORMATION

CROSS-REFERENCE TO RELATED APPLICATIONS

This application claims priority to Chinese Patent Application No. 201910016657.X, filed on Jan. 8, 2019, titled "Method and apparatus for generating information," which is hereby incorporated by reference in its entirety.

TECHNICAL FIELD

Embodiments of the present disclosure relate to the field of computer technology, and in particular to a method and apparatus for generating information.

BACKGROUND

With the rapid development of information technology, information may be issued on various information platforms to expand the scope of information acquired by a user. Generally, an information issuer may display the information on the information platforms. The information platforms may set links for the information. When the user views the information by, e.g., clicking, item information corresponding to the information may be displayed through the links, to facilitate purchasing an item by the user.

SUMMARY

Embodiments of the present disclosure provide a method and apparatus for generating information.

In a first aspect, an embodiment of the present disclosure provides a method for generating information, including: acquiring total number information and initial routing information of a specified item, the initial routing information including current at least one piece of item supply link information and at least one piece of item display link information corresponding to the specified item; querying at least one initial link path between the at least one piece of item supply link information and the at least one piece of item display link information in the initial routing information; determining an updated link path between the at least one piece of item supply link information and the at least one piece of item display link information based on the total number information and the at least one initial link path; and generating and transmitting updated routing information through the updated link path.

In some embodiments, the querying at least one initial link path between at least one piece of item supply link information and at least one piece of item display link information in the initial routing information includes: determining, for item supply link information of the at least one piece of item supply link information, an initial link path corresponding to the item supply link information based on the item display link information having a link relationship with the item supply link information.

In some embodiments, the determining an updated link path between the at least one piece of item supply link information and the at least one piece of item display link information based on the total number information and the at least one initial link path includes: querying, for an initial link path among the at least one initial link path, initial number information corresponding to the initial link path; and establishing an initial corresponding relationship between initial item supply link information, initial item display link information, and the initial number information corresponding to the initial link path; and establishing an initial corresponding relationship table based on at least one initial corresponding relationship corresponding to the at least one initial link path.

In some embodiments, the determining an updated link path between the at least one piece of item supply link information and the at least one piece of item display link information based on the total number information and the at least one initial link path includes: ranking initial number information in the initial corresponding relationship table in descending order, to obtain a number information sequence; extracting a piece of first target item supply link information and a piece of first target item display link information corresponding to a preset number of pieces of initial number information in the number information sequence; and determining a first updated link path corresponding to the specified item based on the piece of first target item supply link information and the piece of first target item display link information.

In some embodiments, the determining an updated link path between the at least one piece of item supply link information and the at least one piece of item display link information based on the total number information and the at least one initial link path includes: setting, for the initial number information in the initial corresponding relationship table, a ratio between clicks of the initial item display link information corresponding to the initial number information and the initial number information as an initial conversion rate, the initial conversion rate being used for representing a probability of converting the clicks of the initial item display link information into the initial number information; ranking initial conversion rates in the initial corresponding relationship table in descending order, to obtain an initial conversion rate sequence; extracting a piece of second target item supply link information and a piece of second target item display link information corresponding to a preset number of pieces of initial number information in the initial conversion rate sequence; and determining a second updated link path corresponding to the specified item based on the piece of second target item supply link information and the piece of second target item display link information.

In a second aspect, an embodiment of the present disclosure provides a method for updating information, including: receiving updated routing information, the updated routing information including at least one updated link path composed of target item supply link information and second target item display link information; and replacing current initial routing information with the updated routing information.

In some embodiments, the replacing current initial routing information with the updated routing information includes: acquiring at least one to-be-modified link path between the updated routing information and the initial routing information; and acquiring, for a to-be-modified link path among the at least one to-be-modified link path, a piece of first interface information of item supply link information and a piece of second interface information of item display link information corresponding to the to-be-modified link path, and establishing data communication between the piece of first interface information and the piece of second interface information.

In a third aspect, an embodiment of the present disclosure provides an apparatus for generating information, including: an information acquiring unit configured to acquire total number information and initial routing information of a specified item, the initial routing information including current at least one piece of item supply link information and at least one piece of item display link information corresponding to the specified item; an initial link path querying unit configured to query at least one initial link path between the at least one piece of item supply link information and the at least one piece of item display link information in the initial routing information; an updated link path determining unit configured to determine an updated link path between the at least one piece of item supply link information and the at least one piece of item display link information based on the total number information and the at least one initial link path; and an updated routing information generating unit configured to generate and transmit updated routing information through the updated link path.

In some embodiments, the initial link path querying unit includes: an initial link path querying subunit configured to determine, for item supply link information of the at least one piece of item supply link information, an initial link path corresponding to the item supply link information based on item display link information having a link relationship with the item supply link information.

In some embodiments, the updated link path determining unit includes: an initial corresponding relationship establishing subunit configured to query, for an initial link path among the at least one initial link path, initial number information corresponding to the initial link path, and establish an initial corresponding relationship between initial item supply link information, initial item display link information, and the initial number information corresponding to the initial link path; and an initial corresponding relationship table establishing subunit configured to establish an initial corresponding relationship table based on at least one initial corresponding relationship corresponding to the at least one initial link path.

In some embodiments, the updated link path determining unit includes: a number information sequence acquiring subunit configured to rank initial number information in the initial corresponding relationship table in descending order, to obtain a number information sequence; a first information extracting subunit configured to extract a piece of first target item supply link information and a piece of first target item display link information corresponding to a preset number of pieces of initial number information in the number information sequence; and a first updated link path determining subunit configured to determine a first updated link path corresponding to the specified item based on the piece of first target item supply link information and the piece of first target item display link information.

In some embodiments, the updated link path determining unit includes: an initial conversion rate calculating subunit configured to set, for the initial number information in the initial corresponding relationship table, a ratio between clicks of the initial item display link information corresponding to the initial number information and the initial number information as an initial conversion rate, the initial conversion rate being used for representing a probability of converting the clicks of the initial item display link information into the initial number information; an initial conversation rate sequence acquiring subunit configured to rank the initial conversion rates in the initial corresponding relationship table in descending order, to obtain an initial conversion rate sequence; a second information extracting subunit configured to extract a piece of second target item supply link information and a piece of second target item display link information corresponding to a preset number of pieces of initial number information in the initial conversion rate sequence; and a second updated link path determining subunit configured to determine a second updated link path corresponding to the specified item based on the piece of second target item supply link information and the piece of second target item display link information.

In a fourth aspect, an embodiment of the present disclosure provides an apparatus for updating information, including: an information receiving unit configured to receive updated routing information, the updated routing information including at least one updated link path composed of target item supply link information and second target item display link information; and a route updating unit configured to replace current initial routing information with the updated routing information.

In some embodiments, the route updating unit includes: a to-be-modified link path acquiring subunit configured to acquire at least one to-be-modified link path between the updated routing information and the initial routing information; and a route updating subunit configured to acquire, for a to-be-modified link path among the at least one to-be-modified link path, a piece of first interface information of item supply link information and a piece of second interface information of item display link information corresponding to the to-be-modified link path, and establish data communication between the piece of first interface information and the piece of second interface information.

In a fifth aspect, an embodiment of the present disclosure provides an electronic device, including: one or more processors; and a memory, storing one or more programs thereon, where the one or more programs, when executed by the one or more processors, cause the one or more processors to execute the method for generating information in the first aspect or the method for updating information in the second aspect.

In a sixth aspect, an embodiment of the present disclosure provides a computer readable medium, storing a computer program thereon, where the program, when executed by a processor, cause the process to implement the method for generating information in the first aspect or the method for updating information in the second aspect.

The method and apparatus for generating information provided by the embodiments of the present disclosure first acquire total number information and initial routing information of a specified item; then query at least one initial link path between the at least one piece of item supply link information and the at least one piece of item display link information in the initial routing information; then determine an updated link path between the at least one piece of item supply link information and the at least one piece of item display link information based on the total number information and the at least one initial link path; and finally generate and transmit updated routing information through the updated link path. In the technical solution of the embodiments, the updated routing information may be generated based on the total number information and the initial routing information, thereby contributing to improving the information display efficiency of the specified item.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It should be understood that the specific embodiments described herein are merely used for explaining the relevant disclosure, rather than limiting the disclosure. In addition, it should be further noted that, for the ease of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
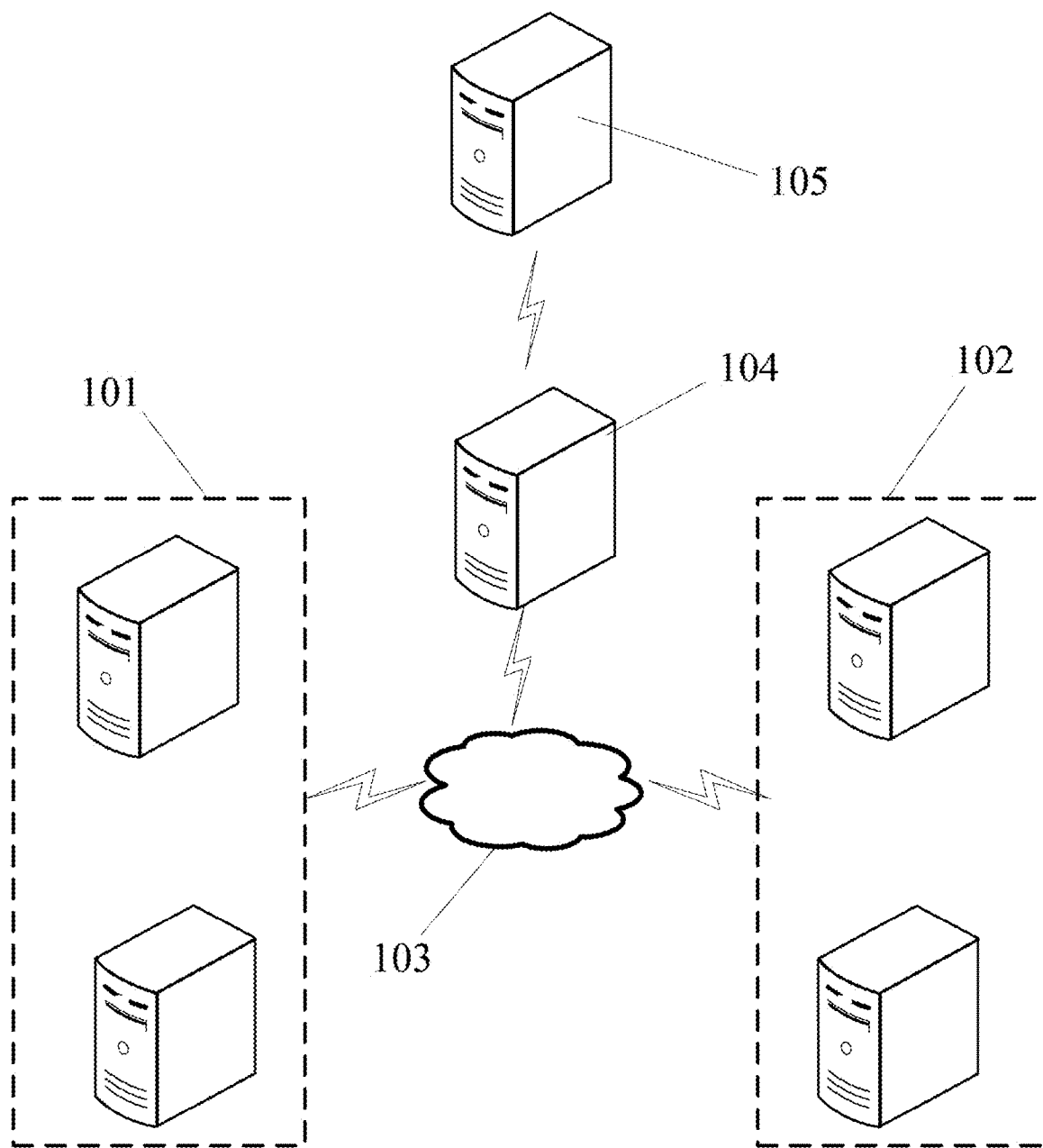
FIG. 1 is an architectural diagram of an exemplary system in which embodiments of the present disclosure may be applied.

FIG. 1 shows an exemplary system architecture 100 in which a method for generating information or an apparatus for generating information of some embodiments of present disclosure may be implemented.

As shown in FIG. 1, the system architecture 100 may include an item display device group 101, an item supply device group 102, a network 103, a routing agent 104, and a server 105. The item display device group 101 includes a plurality of item display devices configured to display information; and the item supply device group 102 includes a plurality of item supply devices configured to purchase items by a user. The routing agent 104 is configured to control a routing path between the item display devices included in the item display device group 101 and the item supply devices included in the item supply device group 102 based on routing information. The server 105 is configured to modify the routing information. The network 103 serves as a medium providing a communication link between the item display device group 101, the item supply device group 102, the routing agent 104, and the server 105. The network 103 may include various link types, such as wired or wireless communication links, or optical cables.

The routing agent 104 may be provided with various communication client applications, such as an information receiving application, an information modifying application, an interface querying application, and a route modifying application.

The routing agent 104 may be hardware or software. When the routing agent 104 is hardware, the routing agent may be various electronic devices having a display screen and supporting routing path control, including but not limited to a smart phone, a tablet computer, a laptop portable computer, a desktop computer, and the like. When the routing agent 104 is software, the routing agent may be installed in the above-listed electronic devices, or be implemented as a plurality of software programs or software modules (e.g., software programs or software modules for providing distributed services), or be implemented as a single software program or software module, which is not specifically limited here.

The server 105 may be a server providing various services, such as a server configured to process total number information on the item supply device group 102 and initial routing information on the routing agent 104, to generate updated routing information. The server may analyze the total number information and the initial routing information, and query an initial link path; then determine an updated link path based on the total number information and the initial link path, and finally generate the updated routing information.

It should be noted that the method for generating information provided by the embodiment of the present disclosure is generally executed by the server 105. Accordingly, the apparatus for generating information is generally provided in the server 105.

It should be noted that the server may be hardware or software. When the server is hardware, the server may be implemented as a distributed server cluster composed of a plurality of servers, or be implemented as a single server. When the server is software, the server may be implemented as a plurality of software programs or software modules (e.g., software programs or software modules for providing distributed services), or be implemented as a single software program or software module, which is not specifically limited here.

It should be understood that the numbers of item display devices, item supply devices, networks, routing agents, and servers in FIG. 1 are merely illustrative. Any number of item display devices, item supply devices, networks, routing agents, and servers may be provided based on actual requirements.

Figure 2:
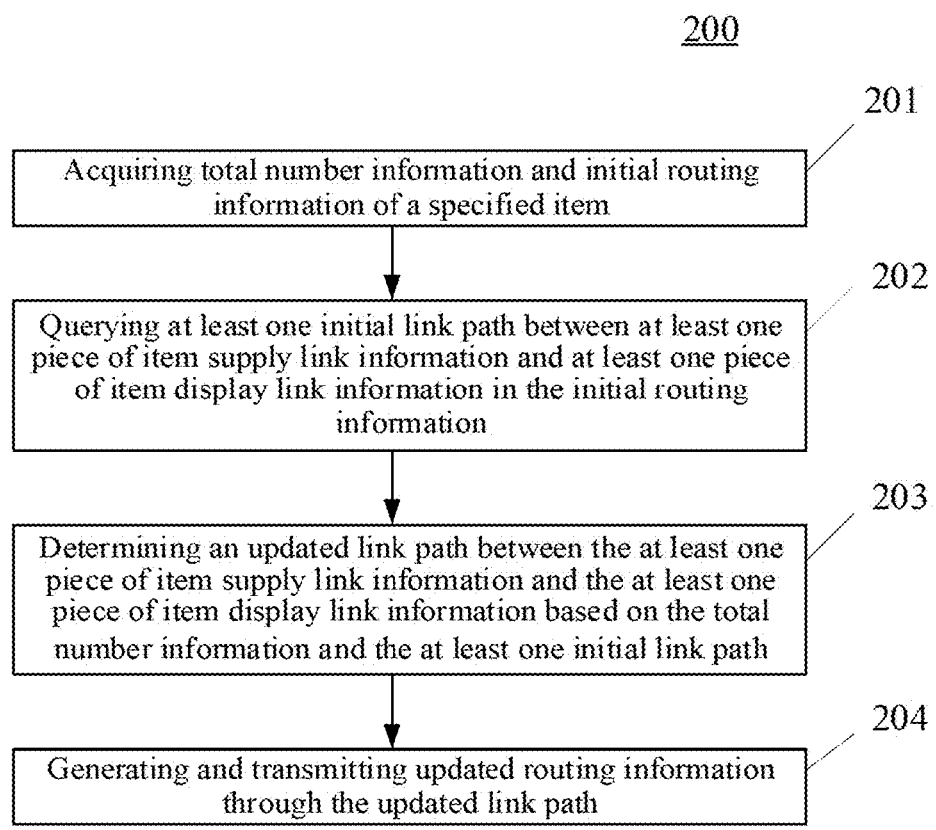
FIG. 2 is a flowchart of a method for generating information according to an embodiment of the present disclosure.

Further referring to FIG. 2, a process 200 of an embodiment of a method for generating information according to the present disclosure is shown. The method for generating information includes the following steps.

Step 201: acquiring total number information and initial routing information of a specified item.

In the present embodiment, an executing body (e.g., the server 105 shown in FIG. 1) of the method for generating information may acquire the total number information of the specified item (e.g., sales volume information of the item) from an item supply device by wired connection or wireless connection, and acquire current initial routing information of the specified item from the routing agent 104. It should be noted that the wireless connection may include, but is not limited to, 3G/4G connection, WiFi connection, Bluetooth connection, WiMAX connection, Zigbee connection, UWB (ultra wideband) connection, and other wireless connections that are known at present or are to be developed in the future.

In the existing technology, an information issuer generally displays information on a plurality of information display platforms simultaneously. However, it is difficult for this information display approach to determine which information display platform on earth causes a purchase operation of a user. Even if which information display platform causes the purchase operation of the user is determined, it is also difficult for the existing technology to realize flexible display of information on the information display platforms, resulting in a low information display efficiency.

In order to improve the information display efficiency, the embodiments of the present disclosure may first acquire the total number information of the specified item from the item supply device, and acquire the current initial routing information of the specified item from the routing agent 104. It should be noted that the number of specified items here is 1, i.e., the total number information and the initial routing information of the item in 1. The initial routing information may include current at least one piece of item supply link information and at least one piece of item display link information corresponding to the specified item. The item supply link information may be a web address, a data interface, or the like of an item supply platform (for example, which may be various e-stores); and the item display link information may be a web address, a data interface, or the like of an item display platform (for example, which may be various information platforms). When it is necessary to improve the information display efficiency of a plurality of items, the executing body according to the embodiments of the present disclosure may acquire the total number information and the initial routing information of each of the plurality of items, respectively.

Step 202: querying at least one initial link path between at least one piece of item supply link information and at least one piece of item display link information in the initial routing information.

After acquiring the initial routing information, the executing body may extract the at least one piece of item supply link information and the at least one piece of item display link information from the initial routing information, and then determine at least one initial link path between the at least one piece of item supply link information and the at least one piece of item display link information.

In some alternative implementations of the present embodiment, the querying at least one initial link path between at least one piece of item supply link information and at least one piece of item display link information in the initial routing information may include: determining, for item supply link information of the at least one piece of item supply link information, determining an initial link path corresponding to the item supply link information based on item display link information having a link relationship with the item supply link information.

In practice, an item supply platform may establish a data link between corresponding specified items with a plurality of item display platforms. Accordingly, the executing body may determine the initial link path between the item supply link information and the item display link information based on a data link relationship between the item supply link information and the item display link information. For example, when one item supply platform has a data link between the corresponding specified items with a plurality of item display platforms, a plurality of initial link paths may be determined based on the item supply link information and the item display link information. The number of initial link paths is identical to the number of item display platforms.

Step 203: determining an updated link path between the at least one piece of item supply link information and the at least one piece of item display link information based on the total number information and the at least one initial link path.

In practice, the number of specified items may vary due to seasons, festivals, specific users, and so on. To this end, the executing body according to embodiments of the present disclosure may analyze the total number information and the initial link path of the specified item, and determine which item supply link information and item display link information corresponding to the initial link path have great contribution to or influence on a total number of specified items. Then, the executing body may update the data link between the item supply link information and the item display link information accordingly, to obtain an updated link path of the specified item.

In some alternative implementations of the present embodiment, the determining an updated link path between the at least one piece of item supply link information and the at least one piece of item display link information based on the total number information and the at least one initial link path may include the following steps.

Step 1: querying, for an initial link path among the at least one initial link path, initial number information corresponding to the initial link path, and establishing an initial corresponding relationship between initial item supply link information, initial item display link information, and the initial number information corresponding to the initial link path.

The user may directly query and purchase the specified item on the item supply platform. The user may also acquire item information via the item display platform, and jump to the item supply platform via the item display platform to purchase the specified item. To this end, the executing body needs to distinguish the number of specified items obtained by different approaches to accurately determine specific influence of the item display platform on the number of specified items, thereby being possible to improve a display efficiency of the item information on the item display platform.

The executing body may query a number of pieces of initial number information of each of the initial link paths. For example, the executing body may acquire an association relationship (for example, which may be in a time sequence) between user information corresponding to the initial link path and user information of purchasing the specified item, and query specific purchase quantity of the specified item, thereby obtaining the initial number information corresponding to the initial link path. Then, the executing body may establish the initial corresponding relationship between the initial item supply link information, the initial item display link information, and the initial number information corresponding to the initial link path.

Step 2: establishing an initial corresponding relationship table based to the least one initial corresponding relationship corresponding to the at least one initial link path.

Each initial link path has at least one initial corresponding relationship. The executing body may establish the initial corresponding relationship table including all of the initial link paths and the initial corresponding relationships.

In some alternative implementations of the present embodiment, the determining an updated link path between the at least one piece of item supply link information and the at least one piece of item display link information based on the total number information and the at least one initial link path may include the following steps.

Step 1: ranking initial number information in the initial corresponding relationship table in descending order, to obtain a number information sequence.

After obtaining the initial corresponding relationship table, the executing body may rank the initial number information in the initial corresponding relationship table in descending order, to obtain the number information sequence.

Step 2: extracting a piece of first target item supply link information and a piece of first target item display link information corresponding to a preset number of pieces of initial number information in the number information sequence.

In practice, the item may have a good number through a plurality of item display platforms and the item supply platforms. Therefore, the executing body may extract the piece of first target item supply link information and the piece of first target item display link information corresponding to the preset number of pieces of initial number information in the number information sequence. It should be noted that the piece of first target item supply link information and the piece of first target item display link information include a plurality of pieces of sublink information, respectively. The number of pieces of sublink information is identical to the preset number.

Step 3: determining a first updated link path corresponding to the specified item based on the piece of first target item supply link information and the piece of first target item display link information.

After obtaining the piece of first target item supply link information and the piece of first target item display link information, the executing body may directly use a link path between a plurality of pieces of sublink information included in a current piece of first target item supply link information and a plurality of pieces of sublink information included in a current piece of first target item display link information as the first updated link path, or may further rank the plurality of pieces of sublink information included in the piece of first target item supply link information and the plurality of pieces of sublink information included in the piece of first target item display link information, and then reestablish a link relationship, to obtain the first updated link path.

In some alternative implementations of the present embodiment, the determining an updated link path between the at least one piece of item supply link information and the at least one piece of item display link information based on the total number information and the at least one initial link path may include the following steps.

Step 1: setting, for the initial number information in the initial corresponding relationship table, a ratio between clicks of the initial item display link information corresponding to the initial number information and the initial number information as an initial conversion rate.

The executing body may not only determine the updated link path based on the number, but also determine the updated link path based on the conversion rate. The executing body may query the clicks of the initial item display link information corresponding to the initial number information, and then set the ratio between the clicks and the initial number information as the initial conversion rate. The initial conversion rate may be used for representing a probability of converting the clicks of the initial item display link information into the initial number information. The higher is the initial conversion rate, the higher is the display efficiency of the item information. The initial conversion rate is converted from the initial number information. Therefore, the initial conversion rate further has a corresponding relationship with the item supply link information and the item display link information.

Step 2: ranking initial conversion rates in the initial corresponding relationship table in descending order, to obtain an initial conversion rate sequence.

The executing body may rank the initial conversion rates in the initial corresponding relationship table in descending order, to obtain the initial conversion rate sequence.

Step 3: extracting a piece of second target item supply link information and a piece of second target item display link information corresponding to a preset number of pieces of initial number information in the initial conversion rate sequence.

The executing body may extract the piece of second target item supply link information and the piece of second target item display link information corresponding to the preset number of pieces of initial number information from the initial conversion rate sequence. In this case, an obtained piece of second target item supply link information and an obtained piece of second target item display link information may be considered as the item supply link information and the item display link information corresponding to a highest display efficiency of the item information. Similar to the piece of first target item display link information, the piece of second target item supply link information and the piece of second target item display link information may also include a plurality of pieces of sublink information, respectively.

Step 4: determining a second updated link path corresponding to the specified item based on the piece of second target item supply link information and the piece of second target item display link information.

The executing body may determine the second updated link path based on the current link relationship between the piece of second target item supply link information and the piece of second target item display link information. The executing body may further rank the plurality of pieces of sublink information included in the piece of second target item supply link information and the plurality of pieces of sublink information included in the piece of second target item display link information, to recreate link relationship to obtain the second updated link path.

Step 204: generating and transmitting updated routing information through the updated link path.

After obtaining the updated link path, the executing body may generate the updated routing information based on the updated link path. Then, the executing body may transmit the updated routing information to the routing agent 104, such that the routing agent 104 adjusts the link relationship between the item supply link information and the item display link information based on the updated routing information, thereby improving the display efficiency of the item information.

Figure 3:
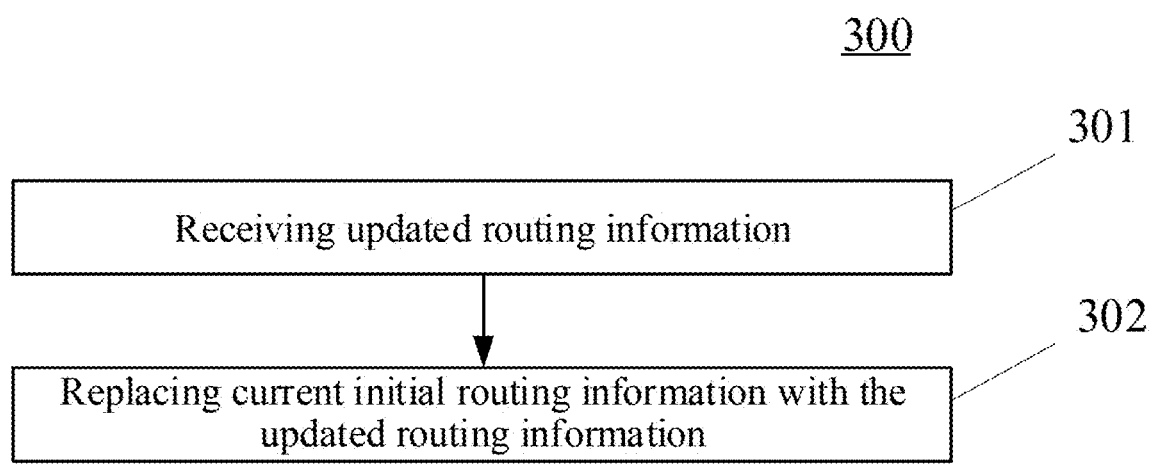
FIG. 3 is a flowchart of a method for updating information according to an embodiment of the present disclosure.

Further referring to FIG. 3, a process 300 of the method for updating information according to another embodiment is shown. The process 300 of the method for updating information includes the following steps.

Step 301: receiving updated routing information.

In the present embodiment, an executing body (e.g., the routing agent 104 shown in FIG. 1) of the method for updating information may acquire initial routing information from an item display platform and an item supply platform through wired connection or wireless connection, and transmit the initial routing information to the server 105 via the network 103. The initial routing information may include current at least one piece of item supply link information and at least one piece of item display link information corresponding to the above specified item. It should be noted that the wireless connection may include, but is not limited to, 3G/4G connection, WiFi connection, Bluetooth connection, WiMAX connection, Zigbee connection, UWB (ultra wideband) connection, and other wireless connections that are known at present or are to be developed in the future.

The executing body may transmit the initial routing information corresponding to an executed item to the server 105 at certain intervals, and receive the updated routing information from the server 105. The updated routing information may include at least one updated link path composed of target item supply link information and second target item display link information.

Step 302: replacing current initial routing information with the updated routing information.

Then, the executing body may replace the current initial routing information based on the updated routing information, to implement modification of a link relationship between the item supply link information and the item display link information corresponding to the specified item, and improve a display efficiency of the specified item.

In some alternative implementations of the present embodiment, the replacing current initial routing information with the updated routing information may further include the following steps.

Step 1: acquiring at least one to-be-modified link path between the updated routing information and the initial routing information.

The updated routing information may be identical to the initial routing information, or be different from the initial routing information, or be partially identical to the initial routing information. Thus, the executing body needs to first determine the at least one to-be-modified link path between the updated routing information and the initial routing information. The to-be-modified link path is routing information that is the difference between the updated routing information and the initial routing information.

Step 2: acquiring, for a to-be-modified link path among the at least one to-be-modified link path, a piece of first interface information of item supply link information and a piece of second interface information of item display link information corresponding to the to-be-modified link path, and establishing data communication between the piece of first interface information and the piece of second interface information.

When modifying the routing information, the executing body needs to acquire the interface information of the item display platform corresponding to the item supply link information and the item supply platform corresponding to the item display link information. That is, the item supply link information and the item display link information also correspond to corresponding interface information, respectively. Specifically, the executing body may acquire the piece of first interface information of item supply link information and the piece of second interface information of item display link information corresponding to the to-be-modified link path, and establish data communication between the piece of first interface information and the piece of second interface information. Thus, by replacing the current initial routing information with the updated routing information, the information display efficiency of the specified item is improved.

Figure 4:
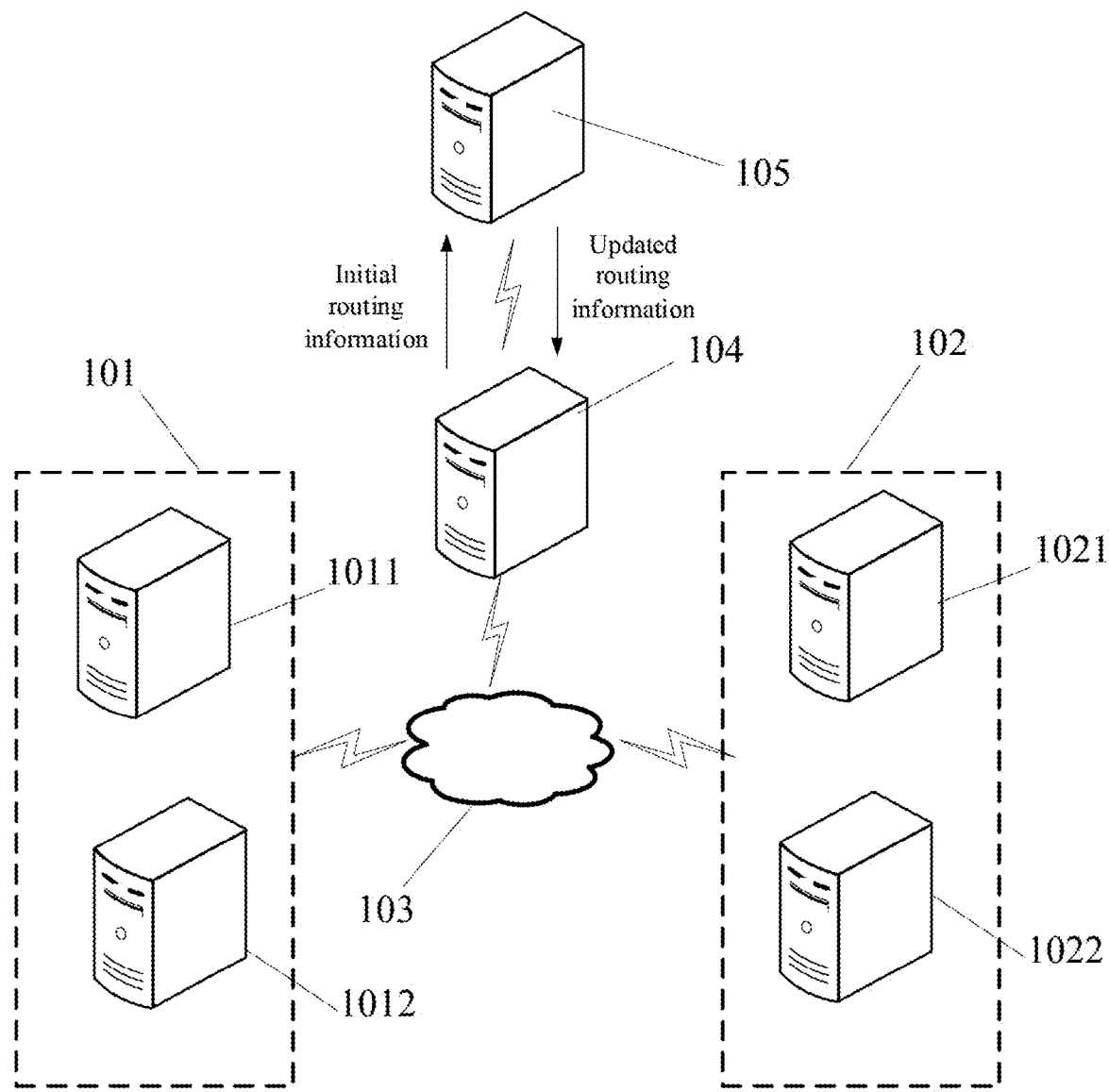
FIG. 4 is a schematic diagram of an application scenario of the method for generating information according to an embodiment of the present disclosure.

Further referring to FIG. 4, which is a schematic diagram of an application scenario of the method for generating information according to an embodiment of the present embodiment. In the application scenario of FIG. 4, the server 105 first acquires total number information of a specified item, and then acquires initial routing information from the routing agent 104; then, the server 105 queries an initial link path; then, the server 105 determines an updated link path based on the total number information and at least one initial link path; and finally, the server 105 generates and transmits the updated routing information through the updated link path.

The method provided by the above embodiments of the present disclosure first acquires total number information and initial routing information of a specified item; then queries at least one initial link path between at least one piece of item supply link information and at least one piece of item display link information of the initial routing information; then determines an updated link path between the at least one piece of item supply link information and the at least one piece of item display link information based on the total number information and the at least one initial link path; and finally generates and transmits updated routing information through the updated link path. In the technical solution of the embodiments of the present disclosure, the updated routing information may be generated based on the total number information and the initial routing information, thereby contributing to improving the information display efficiency of the specified item.

Figure 5:
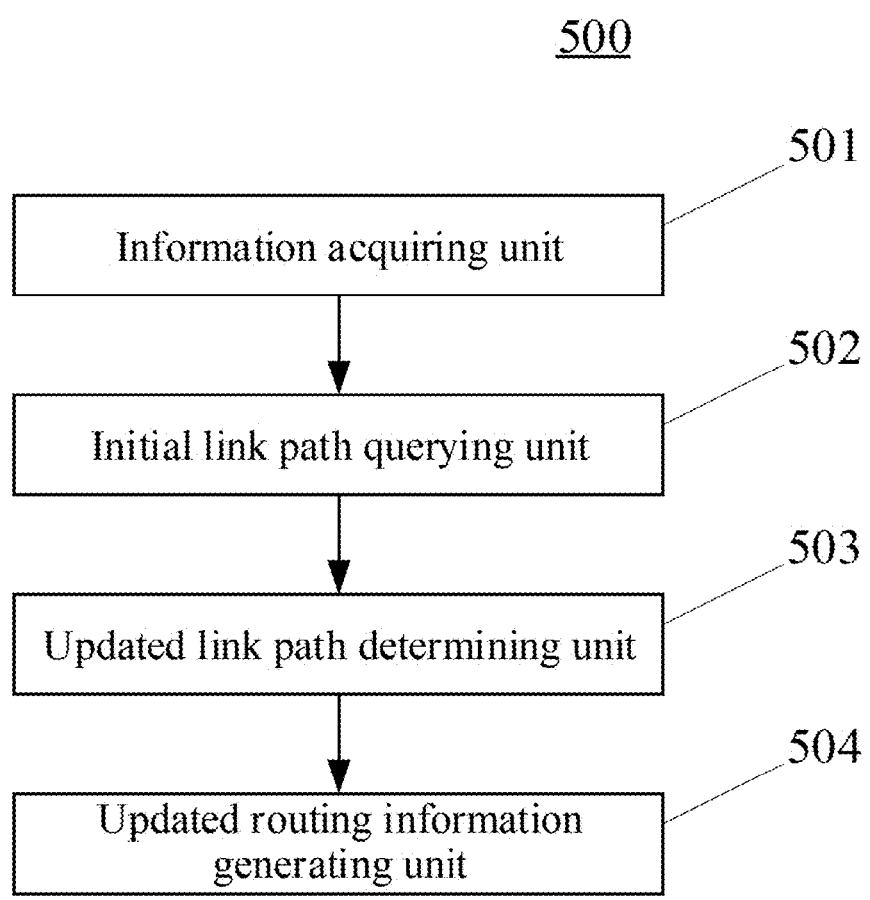
FIG. 5 is a flowchart of an apparatus for generating information according to another embodiment of the present disclosure.

Further referring to FIG. 5, as an implementation of the method shown in the above figures, an embodiment of the present disclosure provides an apparatus for generating information. The embodiment of the apparatus corresponds to the embodiment of the method shown in FIG. 2. The apparatus may be specifically applied to various electronic devices.

As shown in FIG. 5, the apparatus 500 for generating information provided by the present embodiment may include: an information acquiring unit 501, an initial link path querying unit 502, an updated link path determining unit 503, and an updated routing information generating unit 504. The information acquiring unit 501 is configured to acquire total number information and initial routing information of a specified item, the initial routing information including current at least one piece of item supply link information and at least one piece of item display link information corresponding to the specified item; the initial link path querying unit 502 is configured to query at least one initial link path between the at least one piece of item supply link information and the at least one piece of item display link information of the initial routing information; the updated link path determining unit 503 is configured to determine an updated link path between the at least one piece of item supply link information and the at least one piece of item display link information based on the total number information and the at least one initial link path; and the updated routing information generating unit 504 is configured to generate and transmit updated routing information through the updated link path.

In some alternative implementations of the present embodiment, the initial link path querying unit 502 may include: an initial link path querying subunit (not shown in the figure) configured to determine, for item supply link information of the at least one piece of item supply link information, an initial link path corresponding to the item supply link information based on item display link information having a link relationship with the item supply link information.

In some alternative implementations of the present embodiment, the updated link path determining unit 503 may include: an initial corresponding relationship establishing subunit (not shown in the figure) and an initial corresponding relationship table establishing subunit (not shown in the figure). The initial corresponding relationship establishing subunit is configured to query, for an initial link path among the at least one initial link path, initial number information corresponding to the initial link path, and establish an initial corresponding relationship between initial item supply link information, initial item display link information, and the initial number information corresponding to the initial link path; and the initial corresponding relationship table establishing subunit is configured to establish an initial corresponding relationship table based on at least one initial corresponding relationship corresponding to the at least one initial link path.

In some alternative implementations of the present embodiment, the updated link path determining unit 503 may include: a number information sequence acquiring subunit (not shown in the figure), a first information extracting subunit (not shown in the figure), and a first updated link path determining subunit (not shown in the figure). The number information sequence acquiring subunit is configured to rank initial number information in the initial corresponding relationship table in descending order, to obtain a number information sequence; the first information extracting subunit is configured to extract a piece of first target item supply link information and a piece of first target item display link information corresponding to a preset number of pieces of initial number information in the number information sequence; and the first updated link path determining subunit is configured to determine a first updated link path corresponding to the specified item based on the piece of first target item supply link information and the piece of first target item display link information.

In some alternative implementations of the present embodiment, the updated link path determining unit 503 may include: an initial conversion rate calculating subunit (not shown in the figure), an initial conversion rate sequence acquiring subunit (not shown in the figure), a second information extracting subunit (not shown in the figure), and a second updated link path determining subunit (not shown in the figure). The initial conversion rate calculating subunit is configured to set, for the initial number information in the initial corresponding relationship table, a ratio between clicks of the initial item display link information corresponding to the initial number information and the initial number information as an initial conversion rate, the initial conversion rate being used for representing a probability of converting the clicks of the initial item display link information into the initial number information; the initial conversation rate sequence acquiring subunit is configured to rank the initial conversion rates in the initial corresponding relationship table in descending order, to obtain an initial conversion rate sequence; the second information extracting subunit is configured to extract a piece of second target item supply link information and a piece of second target item display link information corresponding to a preset number of pieces of initial number information in the initial conversion rate sequence; and the second updated link path determining subunit is configured to determine a second updated link path corresponding to the specified item based on the piece of second target item supply link information and the piece of second target item display link information.

Figure 6:
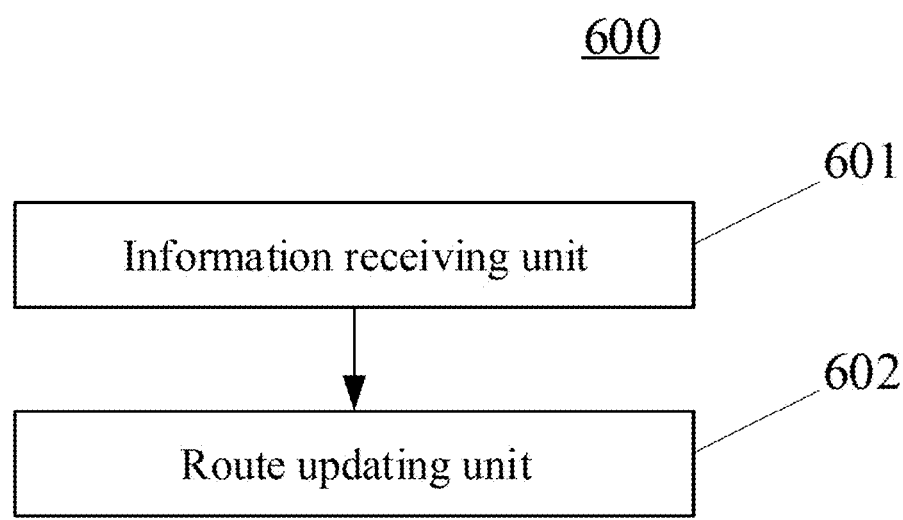
FIG. 6 is a schematic structural diagram of an apparatus for updating information according to an embodiment of the present disclosure.

Further referring to FIG. 6, as an implementation of the method shown in the above figures, an embodiment of the present disclosure provides an apparatus for updating information. The embodiment of the apparatus corresponds to the embodiment of the method shown in FIG. 3. The apparatus may be specifically applied to various electronic devices.

As shown in FIG. 6, the apparatus 600 for updating information of the present embodiment may include: an information receiving unit 601, and a route updating unit 602. The information receiving unit 601 is configured to receive updated routing information, the updated routing information including at least one updated link path composed of target item supply link information and second target item display link information; and the route updating unit 602 is configured to replace current initial routing information with the updated routing information.

In some alternative implementations of the present embodiment, the route updating unit 602 may include: a to-be-modified link path acquiring subunit (not shown in the figure) and a route updating subunit (not shown in the figure). The to-be-modified link path acquiring subunit is configured to acquire at least one to-be-modified link path between the updated routing information and the initial routing information; and the route updating subunit is configured to acquire, for a to-be-modified link path among the at least one to-be-modified link path, a piece of first interface information of item supply link information and a piece of second interface information of item display link information corresponding to the to-be-modified link path, and establish data communication between the piece of first interface information and the piece of second interface information.

The present embodiment further provides an electronic device, including: one or more processors; and a memory, storing one or more programs thereon, where the one or more programs, when executed by the one or more processors, cause the one or more processors to execute the method for generating information or the method for updating information.

The present embodiment further provides a computer readable medium, storing a computer program thereon, where the program, when executed by a processor, cause the processor to implement the method for generating information or the method for updating information.

Figure 7:
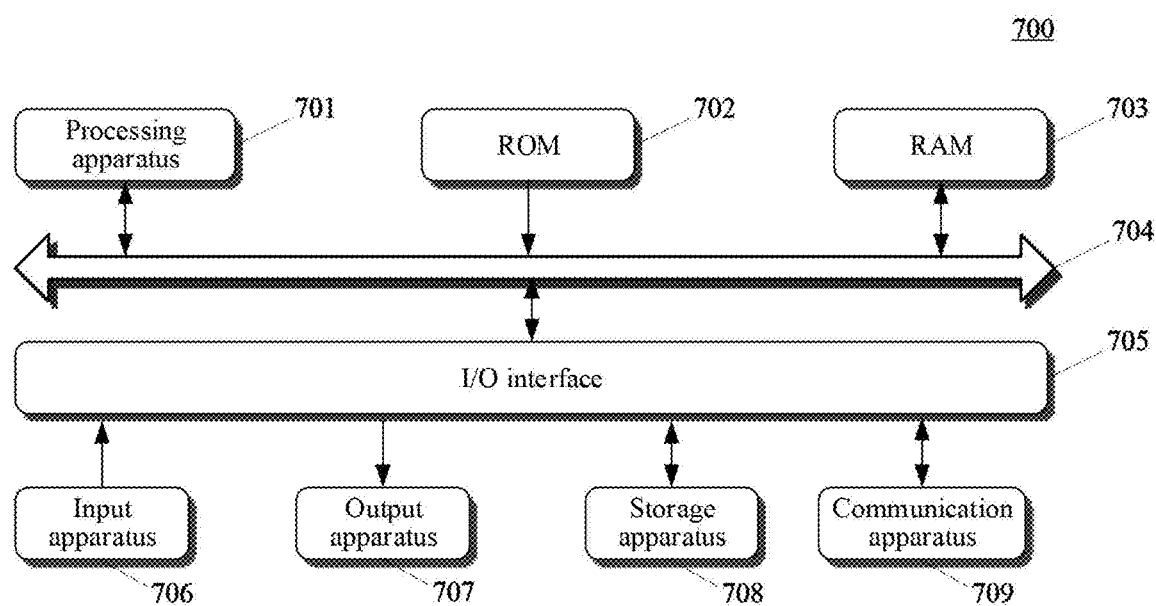
FIG. 7 is a schematic structural diagram adapted to implement an electronic device according to embodiments of the present disclosure.

Referring to FIG. 7 below, a schematic structural diagram of an electronic device 700 adapted to implement an electronic device (e.g., the server 105 in FIG. 1) of embodiments of the present disclosure is shown. The electronic device shown in FIG. 7 is merely an example, and should not limit the functions and scope of use of the embodiments of the present disclosure.

As shown in FIG. 7, the electronic device 700 may include a processing apparatus (e.g., a central processing unit (CPU), or a graphics processor) 701, which may execute various appropriate actions and processes in accordance with a program stored in a read only memory (ROM) 702 or a program loaded into a random access memory (RAM) 703 from a storage apparatus 708. The RAM 703 further stores various programs and data required by operations of the electronic device 700. The processing apparatus 701, the ROM 702 and the RAM 703 are connected to each other through a bus 704. An input/output (I/O) interface 705 is also connected to the bus 704.

In general, the following apparatus may be connected to the I/O interface 705: an input apparatus 706 including a touch screen, a touch pad, a keyboard, a mouse, a camera, a microphone, an accelerometer, a gyroscope, or the like; an output apparatus 707 including a liquid crystal display device (LCD), a speaker, a vibrator, or the like; a storage apparatus 708 including a magnetic tape, a hard disk, or the like; and a communication apparatus 709. The communication apparatus 709 may allow the electronic device 700 to exchange data with other devices through wireless or wired communication. While FIG. 7 shows the electronic device 700 having various apparatuses, it should be understood that it is not necessary to implement or provide all of the apparatuses shown in the figure. More or fewer units may be alternatively implemented or provided. Each block shown in FIG. 7 may represent an apparatus, or represent a plurality of apparatuses as required.

In particular, according to the embodiments of the present disclosure, the process described above with reference to the flow chart may be implemented in a computer software program. For example, an embodiment of the present disclosure includes a computer program product, which includes a computer program that is tangibly embedded in a computer readable medium. The computer program includes program codes for executing the method as illustrated in the flow chart. In such an embodiment, the computer program may be downloaded and installed from a network via the communication apparatus 709, or be installed from the storage apparatus 708, or be installed from the ROM 702. The computer program implements, when executed by the processing apparatus 701, the functions as defined by the method of the embodiments of the present disclosure.

It should be noted that the computer readable medium in the embodiments of the present disclosure may be a computer readable signal medium or a computer readable storage medium or any combination of the above two. An example of the computer readable storage medium may include, but is not limited to: electric, magnetic, optical, electromagnetic, infrared, or semiconductor systems, apparatuses, elements, or a combination of any of the above. A more specific example of the computer readable storage medium may include, but is not limited to: electrical connection with one or more pieces of wire, a portable computer disk, a hard disk, a random access memory (RAM), a read only memory (ROM), an erasable programmable read only memory (EPROM or flash memory), an optical fiber, a portable compact disk read only memory (CD-ROM), an optical memory, a magnetic memory, or any suitable combination of the above. In the embodiments of the present disclosure, the computer readable storage medium may be any tangible medium containing or storing programs which may be used by, or used in combination with, a command execution system, apparatus or element. In the embodiments of the present disclosure, the computer readable signal medium may include data signal in the base band or propagating as parts of a carrier wave, in which computer readable program codes are carried. The propagating data signal may take various forms, including but not limited to an electromagnetic signal, an optical signal, or any suitable combination of the above. The computer readable signal medium may also be any computer readable medium except for the computer readable storage medium. The computer readable signal medium is capable of transmitting, propagating or transferring programs for use by, or used in combination with, a command execution system, apparatus or element. The program codes contained on the computer readable medium may be transmitted with any suitable medium, including but not limited to: wire, optical cable, RF (radio frequency) medium etc., or any suitable combination of the above.

The computer readable medium may be included in the above electronic device; or a stand-alone computer readable medium without being assembled into the electronic device. The computer readable medium stores one or more programs. The one or more programs, when executed by the electronic device, cause the electronic device to: acquire total number information and initial routing information of a specified item, the initial routing information including current at least one piece of item supply link information and at least one piece of item display link information corresponding to the specified item; query at least one initial link path between at least one piece of item supply link information and at least one piece of item display link information of the initial routing information; determine an updated link path between the at least one piece of item supply link information and the at least one piece of item display link information based on the total number information and the at least one initial link path; and generate and transmit updated routing information through the updated link path.

A computer program code for executing operations in the embodiments of the present disclosure may be compiled using one or more programming languages or combinations thereof. The programming languages include object-oriented programming languages, such as Java, Smalltalk or C++, and also include conventional procedural programming languages, such as "C" language, or similar programming languages. The program code may be completely executed on a user's computer, partially executed on a user's computer, executed as a separate software package, partially executed on a user's computer and partially executed on a remote computer, or completely executed on a remote computer or server. In a circumstance involving a remote computer, the remote computer may be connected to a user's computer through any network, including local area network (LAN) or wide area network (WAN), or be connected to an external computer (for example, connected through the Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should be further noted that, in some alternative implementations, the functions denoted by the blocks may occur in a sequence different from the sequences shown in the figures. For example, any two blocks presented in succession may be executed substantially in parallel, or they may sometimes be executed in a reverse sequence, depending on the functions involved. It should be further noted that each block in the block diagrams and/or flow charts as well as a combination of blocks in the block diagrams and/or flow charts may be implemented using a dedicated hardware-based system executing specified functions or operations, or by a combination of dedicated hardware and computer instructions.

The units involved in the embodiments of the present disclosure may be implemented by software or hardware. The described units may also be provided in a processor, for example, described as: a processor including an information acquiring unit, an initial link path querying unit, an updated link path determining unit, and an updated routing information generating unit. The names of the units do not constitute a limitation to such units themselves in some cases. For example, the updated routing information generating unit may be further described as "a unit for updating routing information."

The above description only provides an explanation of the preferred embodiments of the present disclosure and the employed technical principles. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure, for example, technical schemes formed by the above-described features being interchanged with, but not limited to, technical features with similar functions disclosed in the present disclosure.

What is claimed is:

1. A method for generating information, comprising:
acquiring total number information and initial routing information of a specified item, the initial routing information comprising at least one piece of item supply link information and at least one piece of item display link information corresponding to the specified item;
querying at least one initial link path between the at least one piece of item supply link information and the at least one piece of item display link information in the initial routing information;
determining an updated link path between the at least one piece of item supply link information and the at least one piece of item display link information based on the total number information and the at least one initial link path; and
generating and transmitting updated routing information through the updated link path,
wherein the determining of the updated link path between the at least one piece of item supply link information and the at least one piece of item display link information based on the total number information and the at least one initial link path comprises:
  querying, for an initial link path among the at least one initial link path, initial number information corresponding to the initial link path, and establishing an initial corresponding relationship between initial item supply link information, initial item display link information, and the initial number information corresponding to the initial link path; and
  establishing an initial corresponding relationship table based on at least one of the initial corresponding relationships corresponding to the at least one initial link path, and
wherein the determining of the updated link path between the at least one piece of item supply link information and the at least one piece of item display link information based on the total number information and the at least one initial link path comprises:
  ranking the initial number information in the initial corresponding relationship table in descending order, to obtain a number information sequence;
  extracting a piece of first target item supply link information and a piece of first target item display link information corresponding to a preset number of pieces of initial number information in the number information sequence; and
  determining a first updated link path corresponding to the specified item based on the piece of first target item supply link information and the piece of first target item display link information.

2. The method according to claim 1, wherein the querying of the at least one initial link path between the at least one piece of item supply link information and the at least one piece of item display link information in the initial routing information comprises:
  determining, for item supply link information of the at least one piece of item supply link information, an initial link path corresponding to the item supply link information based on item display link information having a link relationship with the item supply link information.

3. The method according to claim 1, wherein the determining of the updated link path between the at least one piece of item supply link information and the at least one piece of item display link information based on the total number information and the at least one initial link path comprises:
  setting, for the initial number information in the initial corresponding relationship table, a ratio between clicks of the initial item display link information corresponding to the initial number information and the initial number information as an initial conversion rate, the initial conversion rate being used for representing a probability of converting the clicks of the initial item display link information into the initial number information;
  ranking initial conversion rates in the initial corresponding relationship table in descending order, to obtain an initial conversion rate sequence;
  extracting a piece of second target item supply link information and a piece of second target item display link information corresponding to a preset number of pieces of initial number information in the initial conversion rate sequence; and
  determining a second updated link path corresponding to the specified item based on the piece of second target item supply link information and the piece of second target item display link information.

4. An apparatus for generating information, comprising:
at least one processor; and
a memory storing instructions, wherein the instructions when executed by the at least one processor, cause the at least one processor to perform operations, the operations comprising:
  acquiring total number information and initial routing information of a specified item, the initial routing information comprising at least one piece of item supply link information and at least one piece of item display link information corresponding to the specified item;
  querying at least one initial link path between the at least one piece of item supply link information and the at least one piece of item display link information in the initial routing information;
  determining an updated link path between the at least one piece of item supply link information and the at least one piece of item display link information based on the total number information and the at least one initial link path; and
  generating and transmitting updated routing information through the updated link path,
  wherein the determining of the updated link path between the at least one piece of item supply link information and the at least one piece of item display link information based on the total number information and the at least one initial link path comprises:
    querying, for an initial link path among the at least one initial link path, initial number information corresponding to the initial link path, and establish an initial corresponding relationship between supply link information, initial item display link information, and the initial number corresponding to the initial link path; and establishing an initial corresponding relationship table based on at least one of the initial corresponding relationships corresponding to the at least one initial link path, wherein the determining of the updated link path between the at least one piece of item supply link information and the at least one piece of item display link information based on the total number information and the at least one initial link path comprises:

ranking the initial number information in the initial corresponding relationship table in descending order, to obtain a number information sequence;

extracting a piece of first target item supply link information and a piece of first target item display link information corresponding to a preset number of pieces of initial number information in the number information sequence; and determining a first updated link path corresponding to the specified item based on the piece of first target item supply link information and the piece of first target item display link information.

5. The apparatus according to claim 4, wherein the querying of the at least one initial link path between the at least one piece of item supply link information and the at least one piece of item display link information in the initial routing information comprises:

determining, for item supply link information of the at least one piece of item supply link information, an initial link path corresponding to the item supply link information based on item display link information having a link relationship with the item supply link information.

6. The apparatus according to claim 4, wherein the determining of the updated link path between the at least one piece of item supply link information and the at least one piece of item display link information based on the total number information and the at least one initial link path comprises:

setting, for the initial number information in the initial corresponding relationship table, a ratio between clicks of the initial item display link information corresponding to the initial number information and the initial number information as an initial conversion rate, the initial conversion rate being used for representing a probability of converting the clicks of the initial item display link information into the initial number information;

ranking the initial conversion rates in the initial corresponding relationship table in descending order, to obtain an initial conversion rate sequence;

extracting a piece of second target item supply link information and a piece of second target item display link information corresponding to a preset number of pieces of initial number information in the initial conversion rate sequence; and determining a second updated link path corresponding to the specified item based on the piece of second target item supply link information and the piece of second target item display link information.

7. A non-transitory computer readable medium, storing a computer program thereon, wherein the computer program, when executed by a processor, cause the processor to implement a method comprising:

acquiring total number information and initial routing information of a specified item, the initial routing information comprising at least one piece of item supply link information and at least one piece of item display link information corresponding to the specified item;

querying at least one initial link path between the at least one piece of item supply link information and the at least one piece of item display link information in the initial routing information;

determining an updated link path between the at least one piece of item supply link information and the at least one piece of item display link information based on the total number information and the at least one initial link path; and generating and transmitting updated routing information through the updated link path, wherein the determining of the updated link path between the at least one piece of item supply link information and the at least one piece of item display link information based on the total number information and the at least one initial link path comprises:

querying, for an initial link path among the at least one initial link path, initial number information corresponding to the initial link path, and establishing an initial corresponding relationship between initial item supply link information, initial item display link information, and the initial number information corresponding to the initial link path; and establishing an initial corresponding relationship table based on at least one of the initial corresponding relationships corresponding to the at least one initial link path, and wherein the determining of the updated link path between the at least one piece of item supply link information and the at least one piece of item display link information based on the total number information and the at least one initial link path comprises:

ranking the initial number information in the initial corresponding relationship table in descending order, to obtain a number information sequence;

extracting a piece of first target item supply link information and a piece of first target item display link information corresponding to a preset number of pieces of initial number information in the number information sequence; and determining a first updated link path corresponding to the specified item based on the piece of first target item supply link information and the piece of first target item display link information.

* * * * *